United States Patent [19]

Quinby

[11] Patent Number: 4,800,183

[45] Date of Patent: Jan. 24, 1989

[54] METHOD FOR PRODUCING REFRACTORY NITRIDES

[75] Inventor: Thomas C. Quinby, Kingston, Tenn.

[73] Assignee: The United States of America as represented by the United States Department of Energy, Washington, D.C.

[21] Appl. No.: 849,625

[22] Filed: Apr. 9, 1986

[51] Int. Cl.$^4$ .......................... C01B 21/06; C01F 7/00
[52] U.S. Cl. ...................................... 501/96; 423/254; 423/290; 423/344; 423/409; 423/411; 423/412; 501/97
[58] Field of Search ............... 423/290, 344, 409, 411, 423/412, 254; 501/96, 97

[56] References Cited

U.S. PATENT DOCUMENTS

| | | | |
|---|---|---|---|
| 2,832,672 | 4/1958 | Fetterley et al. | 423/409 |
| 3,120,998 | 2/1964 | Mercurl et al. | 423/290 |
| 3,141,737 | 7/1964 | Bartlett et al. | 423/412 |
| 3,241,918 | 3/1966 | Lenihan et al. | 423/290 |
| 3,241,919 | 3/1966 | O'Connor | 501/96 |
| 3,671,453 | 6/1972 | Triggiani et al. | 423/409 |
| 4,072,501 | 2/1978 | Quinby . | |
| 4,122,220 | 10/1978 | Sussmuth | 501/97 |
| 4,562,050 | 12/1985 | Koeda et al. | 501/96 |
| 4,618,592 | 10/1986 | Kuramoto et al. | 501/96 |

FOREIGN PATENT DOCUMENTS

| | | | |
|---|---|---|---|
| 687226 | 5/1964 | Canada | 423/290 |
| 0137652 | 4/1985 | European Pat. Off. | 423/290 |
| 1087578 | 8/1960 | Fed. Rep. of Germany | 423/290 |
| 36312 | 2/1985 | Japan | 423/344 |
| 10012 | 1/1986 | Japan | 423/409 |
| 199854 | 7/1967 | U.S.S.R. | 423/409 |
| 875749 | 8/1961 | United Kingdom | 423/290 |
| 2020264A | 11/1979 | United Kingdom . | |
| 2127390A | 4/1984 | United Kingdom . | |

OTHER PUBLICATIONS

Iwama et al., "Ultrafine Powders of TiN and AlN Produced by a Reactive Gas Evaporation Technique with Electron Beam Heating", *Journal of Crystal Growth*, 56(1982), 265–269, North-Holland Pub. Co.

Primary Examiner—John Doll
Assistant Examiner—Wayne A. Langel
Attorney, Agent, or Firm—Katherine P. Lovingood; Stephen D. Hamel; Judson R. Hightower

[57] ABSTRACT

A process for making fine, uniform metal nitride powders that can be hot pressed or sintered. A metal salt is placed in a solvent with Melamine and warmed until a metal-Melamine compound forms. The solution is cooled and the metal-Melamine precipitate is calcined at a temperature below 700° C. to form the metal nitrides and to avoid formation of the metal oxide.

6 Claims, No Drawings

METHOD FOR PRODUCING REFRACTORY NITRIDES

This invention relates to a method for producing high quality, finely divided metal nitride powders and was developed pursuant to a contract with the United States Department of Energy.

BACKGROUND OF THE INVENTION

Metal nitride powders are used for high strength and heat resistant applications, such as in lubricants, engine parts and cutting tools. Ceramic materials with suitable consistency, reliability and economy of manufacture, such as hot pressed or sintered metal nitrides, are being developed for use in adiabatic diesel and turbine engines while operating temperatures of 1,000° C. may be experienced. In this development better metal nitride powders are being sought that are suitable for hot pressing or sintering.

In general, prior art methods for producing metal nitride materials have been by way of a solid-gas phase reactions, as in the manufacture of silicon nitride ($Si_3N_4$) by combining nitrogen ($N_2$) gas or ammonia ($NH_3$) gas at high temperatures with silicon tetrachloride ($SiCl_4$) solid. However, this process is very expensive and the reactant $SiCl_4$ is difficult to make. Therefore, there is a need for a method of producing metal nitrides that will require less rigorous conditions and less expensive starting materials, resulting in a powder that can be sintered or hot pressed.

SUMMARY OF THE INVENTION

In view of the above need, it is an object of this invention to provide an improved method for preparation of metal nitride refractory powders.

Another object of the invention is to provide a method for preparing metal nitride refractory powders by a conventional chemical reaction process that is economical and effective.

Another object of the invention is to provide a method for preparing micron size powders of refractory metal nitrides that can be sintered or hot pressed.

It is a further object of this invention to provide high quality, finely divided metal nitride powders that possess high strength and can withstand high temperatures.

Another object of this invention is to provide a lubricant that can operate at high temperatures.

Additional objects and advantages of the invention will become apparent to those skilled in the art upon examination of the specifications and appended claims of this application. To achieve the foregoing objects this invention is a process for making metal nitride powders by combining 2,4,6-triamino-1,3,5-triazene (Melamine) and a soluble metal compound in a nonreacting solvent and heating this combination until the reactants are in solution. This solution is cooled until a metal-Melamine compound forms as a precipitate which is then filtered from liquid and calcined in air. The calcination must be done at a temperature sufficient to drive off the carbon oxides, oxygen and ammonia and produce the metal nitride but not so high that the metal oxide is formed. The invention is also a composition of matter made by this process. In addition, the invention is a process for forming high density metal nitride articles of manufacture by hot pressing, and the invention is also an article of manufacture of high denisty metal nitride.

This method of preparing metal nitride powder is inexpensive, does not require exteme conditions and results in a high quality, finely divided metal nitride powder than can be used as other ceramics and metal nitride powders are used where high strength under high temperature conditions is desired. The starting materials are readily available and the process is easier to perform than the gas-solid phase reaction.

DETAILED DESCRIPTION OF THE PREFERRED EMBODIMENT

The invention can generally be described as the process of reacting a metal compound with Melamine in solution to form a metal-Melamine compound. This compound is crystallized from solution and calcined to drive off the oxides of carbon, oxygen and gaseous ammonia. Nitride-forming metals are selected from a class including boron, uranium, silicon, aluminum, zirconium, titanium, and tantalum. The metal compound must be soluble in the solvent and capable of reacting with Melamine. Suitable compounds from which the metals are derived include tetraethylsilicate for silicon, boric acid for the boron, and aluminum nitrate for aluminum. Other metal compounds can be used to derive other metals and can be readily determined by one skilled in the art.

The preferred solvent is water although some metal compounds are not entirely soluble in water and require a water-alcohol mixture. An example of such a compound is tetraethylsilicate which is not soluble in water but is soluble in a 50:50 mixture of water and ethanol or other light alcohol.

The reactants are present in stoichiometric amounts with a sufficient excess of Melamine to promote precipitation of the metal-Melamine compound upon cooling. The metal compound and Melamine are placed in the solvent and the mixture is heated until reactants are in solution to a temperature of about 95° C. The most critical aspects of this invention is the temperature at which the calcination of the metal-Melamine compound is done. The temperature must remain low in order for the nitride to be formed, since at high temperatures oxides are the only product. Melamine decomposes at about 500° C. and oxides form at about 800° C.; therefore, for nitride formation the temperature range for calcination is from 600° C. to 700° C.

EXAMPLE

Boron nitride has been prepared using the process of this invention. Powdered boric acid was dissolved in a water solution of 2,4,6-triamino-1,3,5-triazene (Melamine) at a temperature of 100° C. Sufficient boric acid was dissolved to yield a solution having a 3:1 molar ratio of boron to Melamine. The temperature of the resulting solution was slowly reduced to about 25° C. while stirring until a precipitate of boron-Melamine compound was formed. The resulting compound was removed by filtration. The compound was dried and calcined in air at 700° C. to form a finely divided boron niride powder. The boron nitride thus produced was identified by x-ray diffraction and nitrogen assay. it was easily hot pressed to 96 percent of theoretical density without a binder, indicating improved hot pressed properties over powders made using the conventional solid-gas phase technique.

It is believed that any metal which readily forms a nitride compound and forms a neutral soluble compound can be converted to high quality metal nitride powder by the above process. Fineness of the powder can be maximized by increasing the proportionate amount of Melamine to metal compound in the reaction, which would predictably improve the hot pressing characteristics of the powder. Nitrides have been formed using aluminum, zirconium and uranium. A mixture of metal nitrides have also been formed. The compounds boric acid and tetraethylsilicate were used to prepare a mixture of boron nitride and silicon nitride which would be of interest in many applications since $Si_3N_4$ has good wear characteristics and BN has lubricating qualities similar to graphite.

This inexpensive and every simple procedure can be used to make a variety of nitrides that can be hot pressed, pressed and sintered, slip cast or subjected to other conventional techniques for handling refractory powders. Their ability to withstand high temperatures makes them appropriate for use as lubricants in high temperature applications, turbine blades, ceramic engine parts, cutting tools and other similar uses.

I claim:

1. A process for making metal nitride powders comprising: combining Melamine and a soluble metal compound in a non-reacting solvent, said metal compound having a cation capable for reacting with said Melamine to form a metal-Melamine compound;

heating said Melamine and said metal compound in said solvent until in solution resulting in the formation of a metal-Melamine compound, said Melamine present in suitable excess to cause precipitation upon cooling and to minimize particle size of a metal nitride power reaction product;

cooling said solution until a precipitate of said metal-Melamine compound forms;

separating said precipitate from said solvent; and calcining said precipitate in air at 600° to 700° C.

2. The process of claim 1 wherein said soluble metal compound is selected from a group of compounds of boron, uranium, silicon, aluminum, zirconium, titanium, and tantalum;

said nonreacting solvent is selected from the group water, alcohol and a mixture of water and alcohol.

3. The process of claim 2 wherein said metal nitride powder is boron nitride, said metal compound is boric acid, and said nonreacting solvent is water.

4. A process for making high density metal nitride articles of manufacture comprising:

combining Melamine and a soluble metal compound in a nonreacting solvent, said metal compound having a cation capable of reaction with said Melamine to form a metal-Melamine compound;

heating said Melamine and said metal compound in said solvent until in solution resulting in the formation of a metal-Melamine compound, said Melamine present in suitable excess to cause precipitation upon cooling and to minimize particle size of a metal nitride powder reaction product;

cooling said solution until a precipitate of said metal-Melamine compound forms;

separating said precipitate from said solvent;

calcining said precipitate in air at 600° to 700° C. and hot pressing said metal nitride powder to high density.

5. The process of claim 4 wherein said soluble metal compound is selected from a group of compounds of boron, uranium, silicon, aluminum, zirconium, titanium, and tantalum.

6. The process of claim 5 wherein said metal nitride powder is boron nitride, said metal compound is boric acid and said nonreacting solvent is water.

* * * * *